United States Patent [19]
Kern

[11] 3,885,813
[45] May 27, 1975

[54] METHOD AND APPARATUS FOR LEVELING A TRAILER

[75] Inventor: Calvin V. Kern, Maumee, Ohio

[73] Assignee: Eltra Corporation, Toledo, Ohio

[22] Filed: Mar. 25, 1974

[21] Appl. No.: 454,640

[52] U.S. Cl. ............... 280/150.5; 212/145; 254/45; 254/86 R
[51] Int. Cl. .............................................. B60s 9/04
[58] Field of Search .......... 280/150.5, 6 R; 212/145; 254/86 H, 86 R, 45

[56] References Cited
UNITED STATES PATENTS

| | | | |
|---|---|---|---|
| 3,523,698 | 8/1970 | Bishop | 280/150.5 |
| 3,589,748 | 6/1971 | Miller | 280/150.5 |
| 3,669,409 | 6/1972 | Eranosian | 254/45 |
| 3,692,329 | 9/1972 | Conner | 280/150.5 |
| 3,698,758 | 10/1972 | Dodgen | 254/45 X |

Primary Examiner—David Schonberg
Assistant Examiner—Michael J. Forman
Attorney, Agent, or Firm—Robert H. Johnson

[57] ABSTRACT

A method for leveling a trailer which has a floor supported by at least a pair of transversely spaced apart wheels which define an axis for vertical pivotal movement of the trailer. The method includes three sequential steps of pivoting the front of the trailer downward until a line parallel to the floor and passing through the center of the uphill side wheel at an angle to the axis is level, supporting the trailer for vertical pivotal movement about this line, and pivoting the front of the trailer upwardly about this line until a line parallel to the floor and intersecting the first-mentioned line is level.

9 Claims, 9 Drawing Figures

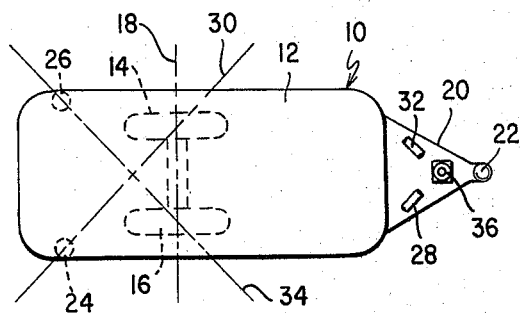
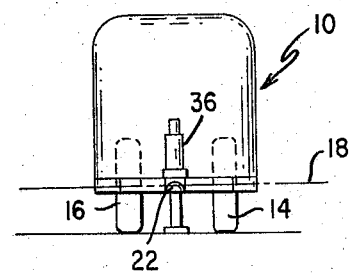
Fig. 1  Fig. 1A
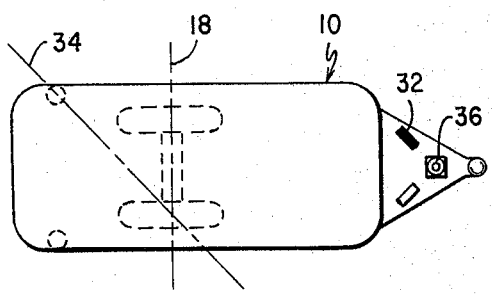
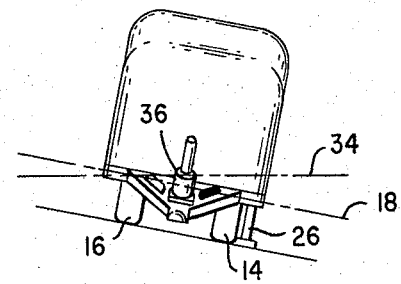
Fig. 2  Fig. 2A
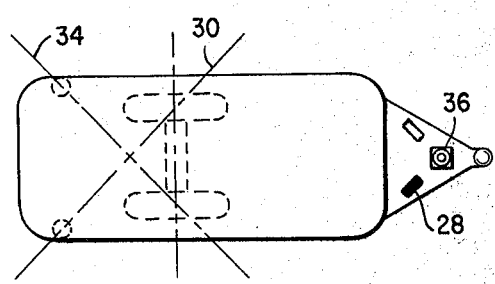
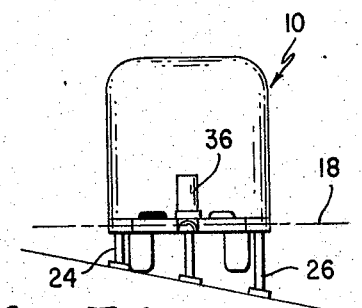
Fig. 3  Fig. 3A
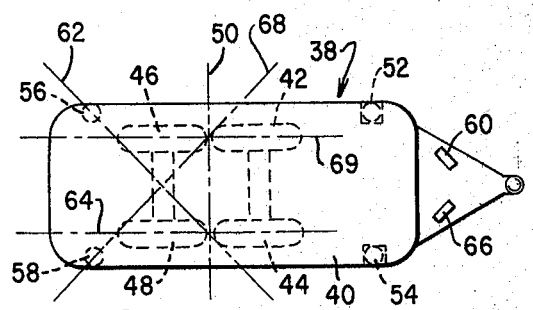
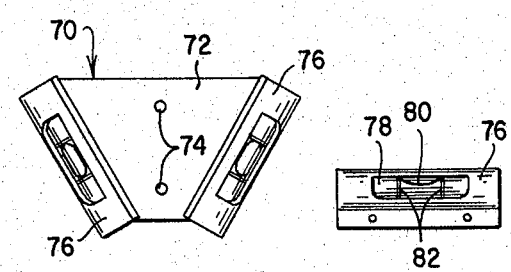
Fig. 4  Fig. 5  Fig. 6

METHOD AND APPARATUS FOR LEVELING A TRAILER

BACKGROUND OF THE INVENTION

The field of art to which this invention relates includes leveling systems, and more specifically leveling systems for trailers and similar vehicles which are moved occasionally and need to be leveled at the new location.

In the use of a travel trailer, by way of example, it is desirable to have the floor of the trailer level when it is parked. The usual system for leveling such trailers uses separate jacks which are located adjacent each corner of the trailer and separately actuated to raise or lower the corners of the trailer. Such systems are troublesome to use because the height of each corner of the trailer must be adjusted and often readjusted in the leveling process until the floor is level. As the size of travel trailers has increased, the use of power-operated jacks has increasingly replaced the use of manually-operated jacks in such leveling systems with the result that such systems are becoming more expensive.

A principal object of my invention is to provide a method for leveling a trailer which is easy to use and inexpensive.

SUMMARY OF THE INVENTION

In carrying out my invention in a preferred embodiment there is provided a trailer with a longitudinally extending and generally retangular floor supported by a pair of transversely spaced apart wheels which define an axis for vertical pivotal movement of the trailer. A pair of adjustable supports are mounted on the trailer adjacent each rear corner and a pair of power-operated jacks are mounted on the trailer adjacent each front corner. A pair of bubble levels are mounted on the trailer and disposed parallel to the floor. One of the levels also is parallel to a line passing through the center of one of the wheels and the diagonally opposite support and the other level is parallel to a line passing through the center of the other wheel and the diagonally opposite support, whereby the trailer can be leveled by actuating the jacks to pivot the front end downwardly until the level parallel to the line passing through the center of the uphill side wheel indicates level, adjusting the support diagonally opposite the uphill side wheel to partially support the trailer, and actuating the jacks to pivot the front end of the trailer upwardly until the other level indicates level.

The above and other objects, features and advantages of my invention will be more easily understood by persons skilled in the art when the detailed description is taken in conjunction with the drawing.

BRIEF DESCRIPTION OF THE DRAWINGS

FIGS. 1 and 1A show schematically the plan and front elevation of a two-wheel travel trailer equipped to practice the method of my invention, FIGS. 2 and 2A are similar to FIGS. 1 and 1A, except that the travel trailer is shown parked on an incline and with the front of the trailer pivoted downwardly in the first step of the leveling method, FIGS. 3 and 3A are similar to FIGS. 2 and 2A, except the trailer is shown leveled, FIG. 4 is a plan view of a four-wheeled trailer equipped to practice the method of my invention, FIG. 5 is a plan view of a level assembly suitable for use in practicing the method of my invention, and FIG. 6 is a side elevation of the level assembly of FIG. 5.

DESCRIPTION OF THE PREFERRED EMBODIMENT

Referring now to FIGS. 1 and 1A, the reference numeral 10 denotes generally a trailer or similar vehicle having a longitudinally extending and generally rectangular floor 12 supported by a pair of transversely spaced apart wheels 14 and 16 which define an axis 18 for vertical pivotal movement of trailer 10. Extending forwardly from the front of trailer 10 is a generally triangular portion 20 which carries the female portion 22 of a conventional ball hitch.

Carried by trailer 10 and located diagonally opposite wheel 14 and rearwardly of axis 18 adjacent one rear corner of floor 12 is an adjustable support 24. Another adjustable support 26 is carried by trailer 10 and similarly located adjacent the other rear corner of floor 12. Both of these supports are manually actuated and are not intended to function as jacks.

Mounted on triangular portion 20 is a bubble level 28 which is disposed parallel to a line 30 which is substantially parallel to the plane of floor 12 and passes through support 24 and substantially the center of wheel 14. As a result level 28 indicates the attitude or inclination of line 30. Similarly, another bubble level 32 is mounted on triangular portion 20 and disposed to indicate the attitude or inclination of a line 34 which is substantially parallel to the plane of floor 12 and passes through support 26 and substantially the center of wheel 16. Also mounted on triangular portion 20 is a generally vertically aligned power-operated jack 36 for raising and lowering the front end of trailer 10.

Referring now to FIGS. 2 through 3A, the operation of my leveling method will be explained. As will be noted, trailer 10 is parked sideways on an incline so that wheel 16 can be termed the uphill side wheel and wheel 14 can be termed the downhill side wheel. In the first step of my leveling method jack 36 is actuated to lower the front of trailer 10 by pivoting about axis 18 until level 32 indicates that line 34 is level or horizontal. After line 34 is level the next step in the method of leveling trailer 10 is to extend support 26 to engage the ground, and thus partially support trailer 10. The next step is to again actuate jack 36, this time to raise the front end of trailer 10. Because support 26 is engaging the ground, trailer 10 will now pivot vertically about line 34. This pivotal movement is continued until level 28 indicates that line 30 is level or horizontal. When this occurs the leveling of trailer 10 has been completed and floor 12 will be level or horizontal in all respects. At the completion of the leveling of trailer 10 it may be desirable, from the standpoint of stability, to extend support 24 until it engages the ground.

If the incline of the ground is opposite to that shown so that wheel 14 is the uphill side wheel, then the leveling method is similar except that support 24 is extended to engage the ground and partially support trailer 10 to define an axis about which to vertically pivot the trailer to complete the last step of the leveling method and the sequence in which levels 28 and 32 are used is reversed.

The leveling method which I have described above can be used equally well with a four-wheeled trailer 38, such as shown in FIG. 4. Trailer 38 has a longitudinally extending, generally rectangular floor 40 supported by a first pair of transversely spaced apart wheels 42 and 44 and a second pair of transversely spaced apart wheels 46 and 48 which are located longitudinally rearwardly of the first-mentioned pair of wheels. These two pairs of wheels define an axis 50 about which trailer 38 is vertically pivotal.

A pair of power-operated jacks 52 and 54 are carried by trailer 38 adjacent the front corners of floor 40 and a pair of adjustable supports 56 and 58 are carried by trailer 38 adjacent the rear corners of floor 40. Also carried by trailer 38 is a bubble level 60 which is disposed to indicate the attitude or inclination of a line 62 which is substantially parallel to the plane of floor 40 and passes through support 56 and the intersection of axis 50 and a line 64 through the centers of wheels 44 and 48. Similarly, a bubble level 66 is carried by trailer 38 and disposed to indicate the attitude or inclination of line 68 which is substantially parallel to the plane of floor 40 and passes through support 58 and the intersection of axis 50 with a line 69 through the centers of wheels 42 and 46. The use of two jacks 52 and 54 for raising and lowering the front end of trailer 38 is advantageous since there is less racking or twisting of the trailer frame than in the case where a single jack is used, as shown in FIG. 2.

While the bubble levels shown in FIGS. 2 and 4 are mounted preferably, as shown, in the area of the jack or jacks for raising and lowering the front end of the trailer their location is not necessarily restricted to this area. They can be located at any location on the trailer and do not need to be located symmetrically to each other. It is only necessary that they are disposed, in the case of the embodiment shown in FIG. 1, to show the attitude or inclination of lines 32 and 34 and in the case of the embodiment shown in FIG. 4 to indicate the attitude or inclination of lines 62 and 68. Further, the two levels may conveniently be combined in an assembly, as shown in FIGS. 5 and 6. Assembly 70 includes a base 72 with a pair of mounting holes 74 and carried by base 72 and integral therewith a pair of bubble levels 76. Each bubble level 76 includes a transparent vial 78 partially filled with fluid to form a bubble 80 which, when centered between a pair of indicator lines 82, indicates that a longitudinally extending line from vial 78 is level or horizontal.

The above detailed description is intended to be illustrative only. My invention is subject to various modifications, changes and the like without departing from the scope and spirit of it. Consequently, the limits of my invention should be determined from the claims appended hereto.

What is claimed is:

1. A method for leveling a trailer or similar vehicle having a longitudinally extending floor supported by first and second transversely spaced apart ground engaging means which establish a transverse axis for vertical pivotal movement of said trailer comprising the steps of: vertically pivoting the trailer about the axis until a line parallel to the trailer floor and passing through substantially the center of the ground engaging means on the uphill side of the trailer at an angle greater than 0° and less than 90° to the axis is level, partially supporting the trailer at a point along said line toward the downhill side of the trailer from the uphill side ground engaging means and vertically pivoting the trailer about said line until a line parallel to the trailer floor and non-parallel to said first-mentioned line is level.

2. The method as set forth in claim 1 wherein said last-mentioned line passes through substantially the center of the ground engaging means on the downhill side of the trailer.

3. The method as set forth in claim 1 wherein said trailer is pivoted in one direction in the first step and in the opposite direction in the last step.

4. A method for leveling a trailer or similar vehicle having a longitudinally extending floor supported by a pair of transversely spaced apart wheels which establish an axis for vertical pivotal movement of said trailer comprising the steps of: pivoting the front end of said trailer downwardly about said axis until a line parallel to said floor and passing through a point on the downhill side of said trailer rearwardly of said axis and substantially the center of the wheel on the uphill side of said trailer is level, partially supporting said trailer at a point along said line between said uphill side wheel and said downhill side of said trailer and pivoting said trailer front end upwardly until a line parallel to said floor and passing through a point on the uphill side of said trailer rearwardly of said axis and substantially the center of the wheel on the downhill side of said trailer is level.

5. A method for leveling a trailer or similar vehicle having a longitudinally extending floor supported by at least two pairs of transversely and longitudinally spaced apart wheels which establish a transverse axis for vertical pivotal movement of said trailer comprising the steps of: vertically pivoting said trailer about said axis until a line parallel to the plane of the floor and passing through a point on the downhill side of said trailer and the point defined by the intersection of said axis with a line connecting substantially the centers of the wheels on the uphill side of said trailer is level, partially supporting said trailer at a point along said line toward the downhill side of said trailer from said uphill side wheels and vertically pivoting said trailer until a line parallel to the plane of said floor and intersecting said first-mentioned line is level.

6. In a trailer having a longitudinally extending generally rectangular floor supported by a pair of transversely spaced apart ground engaging means which establish a transverse axis for vertical pivotal movement of said trailer, the improvement comprising jack means mounted on the trailer for raising and lowering the front end of the trailer, a first adjustable support mounted on the trailer and located adjacent one rear corner of the trailer, a second adjustable support mounted on the trailer and located adjacent the other rear corner of the trailer, a first level mounted on the trailer and disposed to indicate the attitude of a line parallel to the floor of the trailer and passing through substantially the center of one of the ground engaging means and the location of the support adjacent the rear corner diagonally opposite from the one ground engaging means and a second level mounted on the trailer and disposed to indicate the attitude of a line parallel to the floor of the trailer and passing through substantially the center of the other ground engaging means and the location of the support adjacent the rear corner diagonally opposite from the other ground engaging means.

7. The improvement as set forth in claim 6 wherein said jack means is power operated and said supports are manually adjusted.

8. The improvement as set forth in claim 6 wherein said jack means includes first and second power-operated jacks located adjacent the front corners of the trailer.

9. A trailer comprising a longitudinally extending generally rectangular floor, first and second transversely spaced apart ground engaging means which support said floor and establish a transverse axis for vertical pivotal movement of said floor, first and second jacks mounted on the trailer adjacent the front corners thereof, first and second adjustable supports mounted on the trailer adjacent the rear corners thereof, a first level mounted on the trailer to indicate the attitude of a line parallel to said floor and passing through said first support and substantially the center of the ground engaging means diagonally opposite therefrom and a second level mounted on the trailer to indicate the attitude of a line parallel to said floor and passing through said second support and substantially the center of the ground engaging means diagonally opposite therefrom.

* * * * *